(12) United States Patent
Kunimasa et al.

(10) Patent No.: US 7,065,259 B2
(45) Date of Patent: Jun. 20, 2006

(54) IMAGE PROCESSOR, IMAGE PROCESSING METHOD AND STORAGE MEDIUM

(75) Inventors: Takeshi Kunimasa, Ebina (JP); Toru Hada, Ebina (JP); Kenichi Ishida, Ebina (JP); Masao Morita, Ebina (JP); Yozo Yamaguchi, Ebina (JP); Masami Kurata, Ebina (JP); Hiroshi Sekine, Ebina (JP); Hiroyuki Kawano, Ebina (JP); Takanobu Otsubo, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 800 days.

(21) Appl. No.: 09/842,183

(22) Filed: Apr. 26, 2001

(65) Prior Publication Data

US 2001/0036316 A1 Nov. 1, 2001

(30) Foreign Application Priority Data

Apr. 27, 2000 (JP) .............................. 2000-128345

(51) Int. Cl.
*G06K 6/36* (2006.01)
(52) U.S. Cl. ...................... 382/281; 382/135; 382/137; 358/537; 358/443
(58) Field of Classification Search ................ 382/135, 382/137, 140, 209, 219, 278, 165, 170, 224, 382/149, 151; 358/1.14, 537, 452, 443; 399/366
See application file for complete search history.

(56) References Cited

U.S. PATENT DOCUMENTS

| | | | | |
|---|---|---|---|---|
| 5,216,724 A | * | 6/1993 | Suzuki et al. ............... | 382/135 |
| 5,565,962 A | * | 10/1996 | Yoshimoto .................. | 399/366 |
| 5,568,550 A | * | 10/1996 | Ur .............................. | 382/306 |
| 5,740,514 A | * | 4/1998 | Natsudaira .................. | 399/366 |
| 5,982,956 A | * | 11/1999 | Lahmi ......................... | 382/306 |
| 6,116,510 A | * | 9/2000 | Nishino ...................... | 235/494 |
| 6,188,787 B1 | * | 2/2001 | Ohmae et al. .............. | 382/165 |
| 6,687,017 B1 | * | 2/2004 | Kakiuchi et al. .......... | 358/1.14 |

FOREIGN PATENT DOCUMENTS

| | | |
|---|---|---|
| JP | 6-54186 | 2/1994 |
| JP | 6-225134 | 8/1994 |
| JP | 8-335267 | 12/1996 |
| JP | 9-18709 | 1/1997 |

* cited by examiner

*Primary Examiner*—Samir Ahmed
*Assistant Examiner*—Yosef Kassa
(74) *Attorney, Agent, or Firm*—Morgan, Lewis & Bockius, LLP

(57) ABSTRACT

The present invention provides an image processor and an image processing method wherein a specific image such as an image of which the printing is prohibited can be recognized at high speed and in addition, with high precision. A rendering command analysis unit passes a rendering object to any of a recognition unit for a raster image, a recognition unit for graphics and a recognition unit for a character according to the type of the rendering object in the rendering command and tries to recognize a specific image. The result of recognition by each recognition unit is passed to a recognition determination unit and it is synthetically determined based upon these results of recognition whether the specific image exists or not. Even if the specific image is formed by dividing into plural types of rendering objects, the specific image can be recognized by such recognition processing. Also, processing for generating output image data by an output image data generation unit according to a rendering command and outputting it is executed in parallel with such recognition processing so as to speed up processing.

20 Claims, 12 Drawing Sheets

SYNTHETIC DETERMINATION

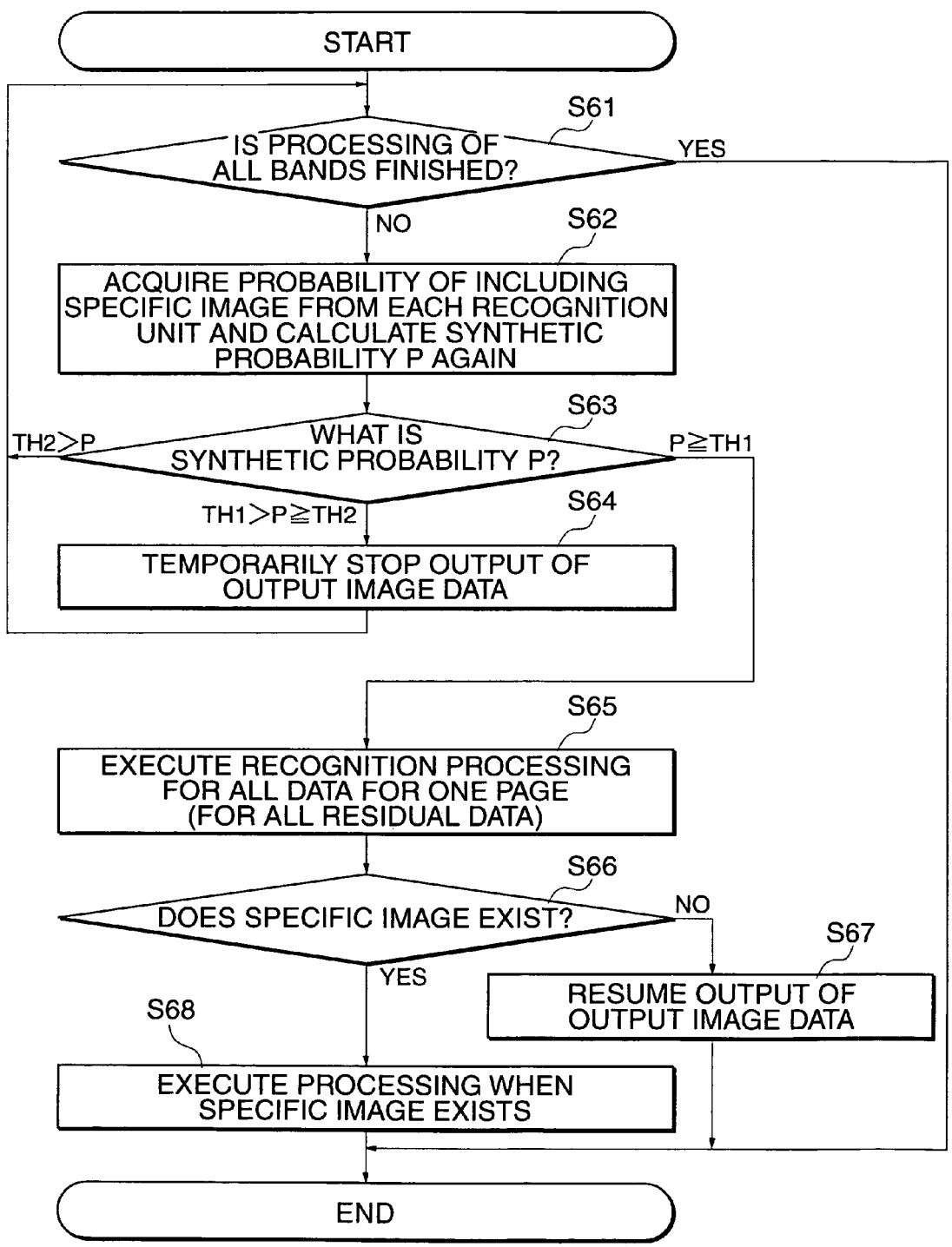

IMAGE PROCESSOR, IMAGE PROCESSING METHOD AND STORAGE MEDIUM

BACKGROUND OF THE INVENTION

1. Field of the Invention

The present invention relates to an image processor provided with a function for recognizing a specific image, an image processing method and a storage medium storing a program for implementing such a function.

2. Description of the Related Art

Recently, the quality of an image of a color copying machine and a color printer, a function of a personal computer, the quality of an image of a scanner and others have been enhanced and a print of high quality has become relatively easy to prepare. Hereby, a problem is caused that securities such as a bank note and a ticket of which the copying is prohibited can be illegally copied by using these machines.

To mainly prohibit such illegal copying, various methods of recognizing an image of which the printing is prohibited by digital image processing technology are proposed in documents such as Japanese Published Unexamined Patent Applications No. Hei 6-54186, No. Hei 6-225134, No. Hei 8-335267 and No. Hei 9-18709.

In case an instruction for output is issued to a printer connected to a network, it is generally performed to represent print data in a page description language (hereinafter called PDL). The printer connected to the network interprets a sent PDL, generates raster data of resolution suitable for the resolution of the printer and finally prints an image on paper.

FIG. 13 is a flowchart showing an example of printing operation in case processing for recognizing an image of which the printing is prohibited is executed by a printer. As described above, for technique for checking to see whether or not an image itself is an image of which the printing is prohibited, various methods are proposed. In case these techniques are applied to a printer connected to a network, a procedure shown in FIG. 13 for example is executed.

In an example shown in FIG. 13, PDL to be printed is rasterized in a step S81 and it is determined in a step S82 whether or not the rasterized image includes an image of which the printing is prohibited. In case an image of which the printing is prohibited is not included, the image rasterized in S81 is formed on paper for example in a step S84. Also, in case an image of which the printing is prohibited is included, the whole page or an area of the image of which the printing is prohibited is blanked in a step S83 or a message that printing is disabled is printed in S83.

In case the image of which the printing is prohibited is included in print data, the image can be determined by such processing so that it is not printed. However, in the processing shown in FIG. 13 or the conventional type recognition processing of an image of which the printing is prohibited, the raster image of all print data is made and afterward, it is determined whether or not an image of which the printing is prohibited is included.

As only a raster image is input to a copying machine and others, a conventional type recognition method can be adopted. However, in a printer for example, only after a raster image is made based upon a PDL as shown in FIG. 13, recognition processing can be executed. Therefore, until an image is actually printed and output after a raster image is made, processing for recognizing an image of which the printing is prohibited is executed and there is a problem that time required till printing and output is extended. When recognition processing is applied to a raster image for printing for one page for example, it takes approximately ten and several to several tens seconds and in consideration of the recent speedup of an output device, such long processing time cannot be allowed.

SUMMARY OF THE INVENTION

The present invention is made in view of the situation described above and provides an image processor and an image processing method that can recognize a specific image such as an image of which the printing is prohibited at high speed and in addition, with high precision and a computer-readable storage medium storing a program for making a computer execute such an image processing method.

In the invention, it is recognized whether each rendering object includes a specific image per type or not when image data including one or plural rendering objects is passed and it is determined based upon the result of recognition for each rendering object whether the specific image is included in the image data or not. Hereby, the specific image can be recognized before all rendering objects are developed in a raster image. Also, recognition processing per rendering object does not require so much time and can be executed in parallel with the generation of output image data for example. Therefore, time required for only recognition can be reduced, compared with a conventional case where a specific image is recognized after a raster image is generated and a specific image can be recognized at high speed. Further, as the results of recognition for each rendering object are synthesized and a specific image is recognized, a specific image can also be recognized precisely in a wicked case where the composition of the specific image is tried by combining different types of rendering objects.

Also, in the invention, when image data including one or plural rendering objects is passed, the recognition of a specific image is first tried for a specific type of rendering object and when the result shows the possibility of including the specific image, the recognition of the specific image is also tried for the other types of rendering objects. When a specific type of rendering object such as a raster image is not utilized in case a specific image is made up, the composition of the specific image may be very difficult. In such a case, the recognition of the specific image is first tried for the specific type of rendering object and recognition processing can be sped up by finishing the recognition processing as it is in case no specific image is included. Also, when the result of the trial of the recognition for a specific type of rendering object shows the possibility of including a specific image, the recognition of the specific image is also tried for the other types of rendering objects. Hereby, the precision of the recognition of the specific image can be kept. Also, as rendering objects are synthesized and recognition processing is applied even if a specific image is made up of plural types of rendering objects for example, the specific image can be recognized.

Further, in the invention, the recognition of a specific image is tried for image data divided per partial image, the results per partial image are synthesized and it is determined whether a specific image is included or not. Technique for executing recognition processing per type of a rendering object as described above or first trying the recognition for a specific type of rendering object can be used for recognizing a specific image per partial image. For example, as the results of the trial of recognition per partial image are synthesized and it is determined whether a specific image is included or not even if the specific image is divided and output and is formed as a result, the specific image can be precisely recognized. Also, in case output image data for one page is divided and output corresponding to the characteristic of an output device, recognition per output unit can be tried by executing recognition processing per partial image without making up a raster image for one page. Therefore, processing for recognizing a specific image can be executed while outputting output image data, and time required for only recognition processing can be reduced.

As processing for recognizing a specific image is executed as described above before a raster image for one page is generated in the invention, processing for recognizing a specific image can be executed in parallel with output image data generation processing for generating output image data based upon image data and outputting it. In this case, when it is determined that the possibility of including a specific image in image data is high, it is desirable that output image data generation processing is stopped. Hereby, the output of output image data for forming a specific image can be stopped at an early stage.

BRIEF DESCRIPTION OF THE DRAWINGS

Preferred embodiments of the present invention will be described in detail based on the followings, wherein:

FIG. 6 is a flowchart showing another example of the operation of the recognition determination unit 20 in the example of the image formation system including one embodiment of the invention;

DETAILED DESCRIPTION OF THE PREFERRED EMBODIMENTS

Figure 1:
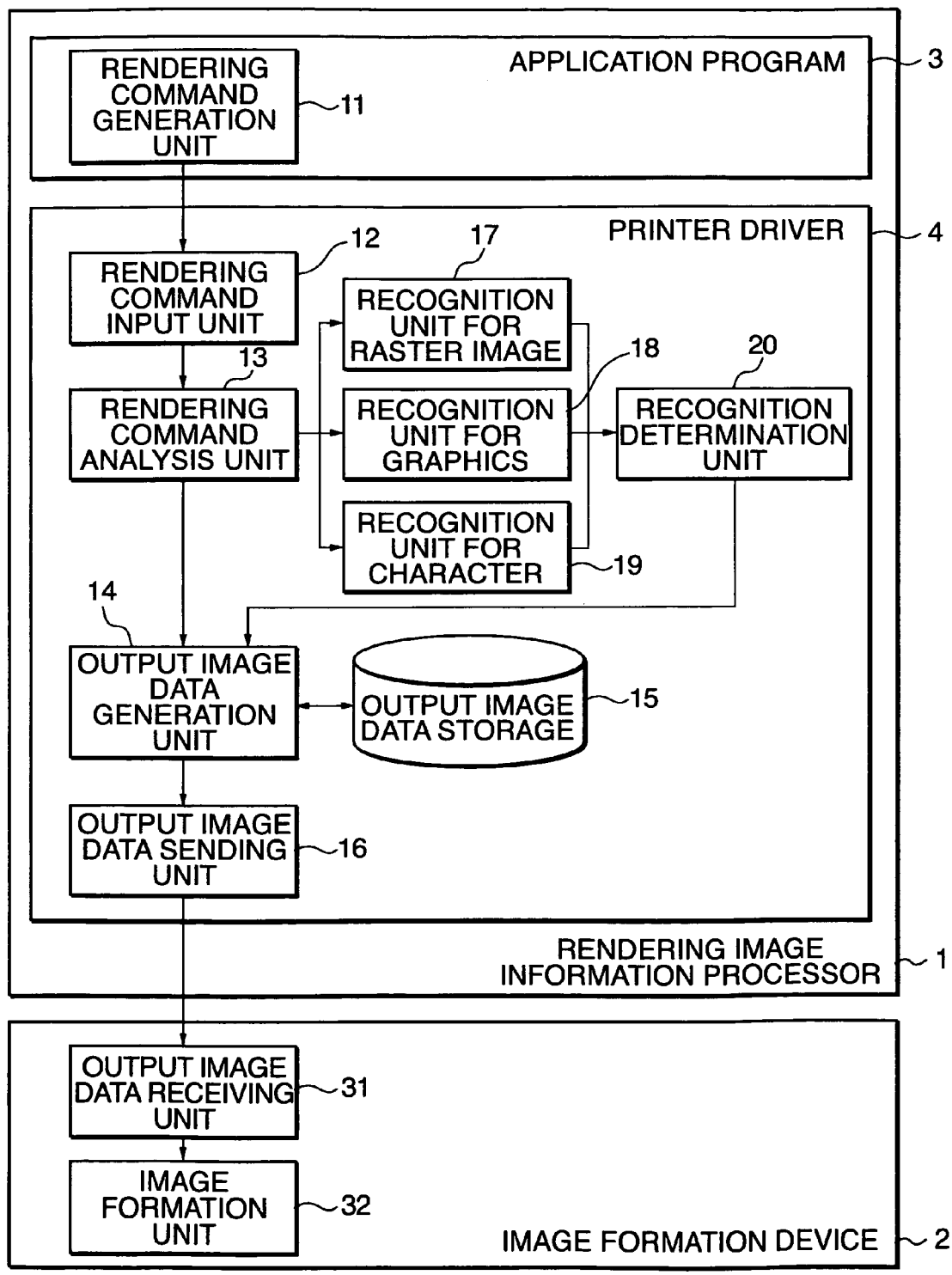
FIG. 1 is a block diagram showing an example of an image formation system including one embodiment of the invention.

FIG. 1 is a block diagram showing an example of an image formation system including one embodiment of the invention. As shown in FIG. 1, a reference number 1 denotes a rendering image information processor, 2 denotes an image formation device, 3 denotes an application program, 4 denotes a printer driver, 11 denotes a rendering command generation unit, 12 denotes a rendering command input unit, 13 denotes a rendering command analysis unit, 14 denotes an output image data generation unit, 15 denotes an output image data storage, 16 denotes an output image data sending unit, 17 denotes a recognition unit for a raster image, 18 denotes a recognition unit for graphics, 19 denotes a recognition unit for a character, 20 denotes a recognition determination unit, 31 denotes an output image data receiving unit and 32 denotes an image formation unit. In this example, an example in which an image processor according to the invention is provided in the printer driver 4 in the rendering image information processor 1 is shown.

The rendering image information processor 1 generates output image data to be printed by the image formation device 2 and outputs it to the image formation device 2 via a network such as LAN and a public line or a cable and others. The image formation device 2 that receives the output image data forms an image on recording paper for example according to the output image data.

In the rendering image information processor 1, various application programs 3 are run and the printer driver 4 that generates output image data and outputs it to the image formation device 2 is provided. When a request for image formation is made in the application program 3, the rendering command generation unit 11 generates a rendering command as a set of rendering objects and transfers the rendering command to the printer driver 4 directly or via an OS and others.

The rendering command input unit 12 of the printer driver 4 receives the rendering command generated in the rendering command generation unit 11 in the application program 3 and passes it to the rendering command analysis unit 13. The rendering command analysis unit 13 analyzes the rendering command and passes the result of the analysis of the rendering command to the output image data generation unit 14. The rendering command analysis unit 13 also passes a rendering object to the recognition unit (the recognition unit for a raster image 17, the recognition unit for graphics 18 and the recognition unit for a character 19) according to the type per rendering object in the rendering command.

The output image data generation unit 14 generates output image data corresponding to the image formation device 2 according to the result of the analysis of the rendering command in the rendering command analysis unit 13. The generated output image data can be stored in the output image data storage 15. The output image data generated in the output image data generation unit 14 is sent from the output image data sending unit 16 to the image formation device 2.

The recognition unit for a raster image 17 receives a rendering object from the rendering command analysis unit 13 in case the rendering object in the rendering command is a raster image and tries to recognize the specific image or a part of the specific image in the rendering object. Recognition processing may also be the output of the probability of being the specific image for example even if no specific image completely exists.

The recognition unit for graphics 18 receives a rendering object from the rendering command analysis unit 13 in case the rendering object in the rendering command is a graphic form and recognizes whether or not there is the possibility of rendering a part of the specific image in the rendering object. Recognition processing may also be the output of the possibility of rendering a part of the specific image in the form of probability for example.

The recognition unit for a character 19 receives a rendering object from the rendering command analysis unit 13 in case the rendering object in the rendering command is a character and recognizes whether or not there is the possibility of being a character making up a part of the specific image in the rendering object. If the specific image is a Japanese bank note, characters such as "Bank of Japan note" are conceivable. Needless to say, recognition can be performed in consideration of a style of type and others in addition to a character string. Recognition processing may also be the output of the possibility making up a part of the specific image in the form of probability for example.

In this example, the recognition unit for a raster image 17, the recognition unit for graphics 18 and the recognition unit for a character 19 are described as a recognition unit corresponding to the type of a rendering object, however, the invention is naturally not limited to this and a recognition unit corresponding to the type of various rendering objects may be provided.

The recognition determination unit 20 synthesizes the result of recognition respectively by the recognition unit for a raster image 17, the recognition unit for graphics 18 and the recognition unit for a character 19 and determines whether the specific image is included or not. Even if the specific image is formed by using a raster image for the background of the specific image and overwriting a character, a graphic form and others on the background, the existence of the specific image can be recognized by synthesizing the result of recognition per type of rendering objects.

The image formation device 2 is provided with the output image data receiving unit 31 and the image formation unit 32, receives output image data sent from the rendering image information processor 1 in the output image data receiving unit 31 and forms an image on paper for example based upon the output image data in the image formation unit 32.

Figure 2:
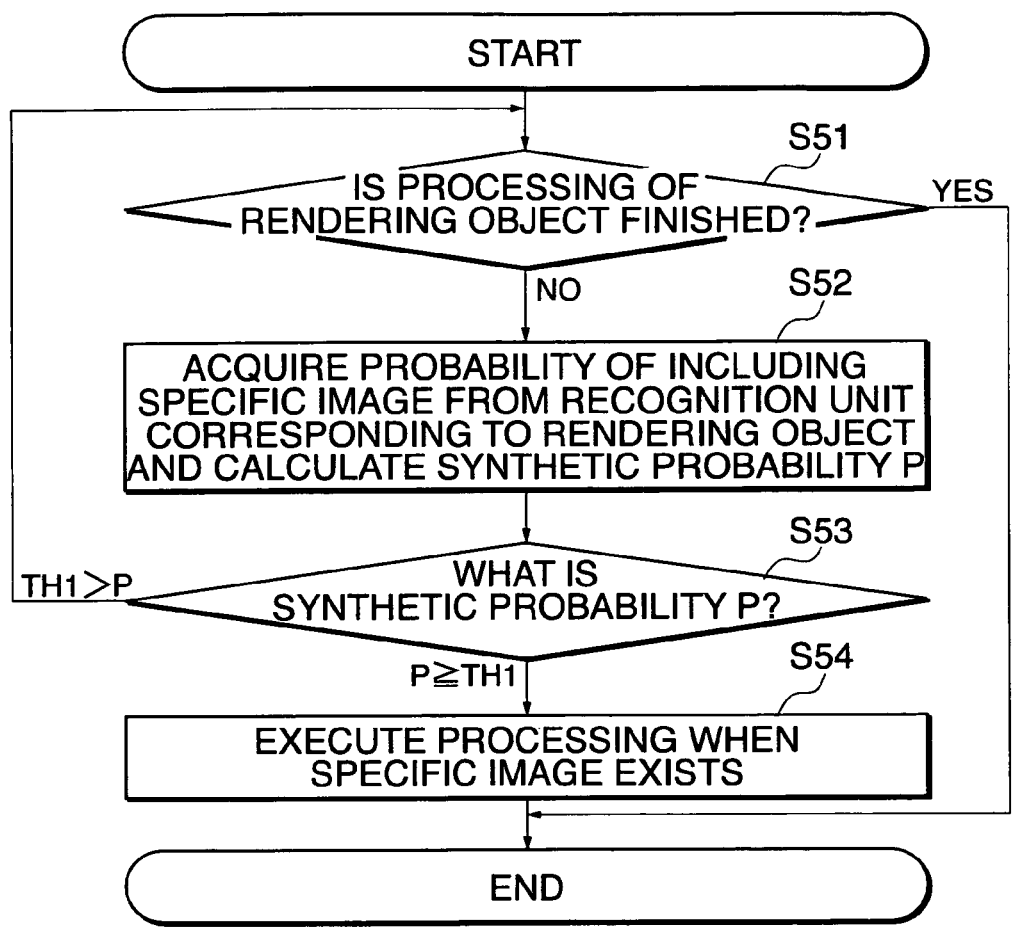
FIG. 2 is a flowchart showing an example of the operation of a recognition determination unit 20 in the example of the image formation system including one embodiment of the invention.

FIG. 2 is a flowchart showing an example of the operation of the recognition determination unit 20 in an example of the image formation system including one embodiment of the invention. The rendering command analysis unit 13 interprets one of rendering commands and passes a rendering object to the recognition unit corresponding to the type of the rendering object. The recognition unit that receives the rendering object recognizes whether the specific image or a part is included or not or whether there is the possibility of making up a part of the specific image or not and outputs the probability to the recognition determination unit 20.

The recognition determination unit 20 determines the termination of the rendering object in a step S51 and in case the rendering object exists, the recognition determination unit 20 acquires the probability of including the specific image as the result of recognition from the recognition unit corresponding to the type of the rendering object, that is, any of the recognition unit for a raster image 17, the recognition unit for graphics 18 and the recognition unit for a character 19 in this example in a step S52, synthetically determines the results till then of recognition from each recognition unit and calculates synthetic probability P. A method of calculating the synthetic probability P is arbitrary.

In a step S53, the synthetic probability P calculated in S52 and a predetermined threshold TH1 are compared. In case the synthetic probability P is smaller than the predetermined threshold TH1, it is judged that the specific image is not included and the processing is continued as it is. Also, in case the synthetic probability P exceeds the predetermined threshold TH1, it is judged that the possibility of including the specific image is high and processing when the specific image exists is executed in a step S54. For the processing when the specific image exists, for example, the output of output image data is stopped, output image data to be blank one page and an image in which predetermined patterns are overlapped is output or output image data including a character string to be a message that printing is prohibited because the specific image exists can be generated.

As described above, recognition processing can be executed in parallel with the generation of output image data by performing recognition every type of each rendering object, synthesizing the results of recognition and determining the exists of the specific image, processing time is not consumed only for recognition and as a whole, the processing can be sped up. Also, as the results of the recognition of respective rendering objects are synthesized even if the specific image is formed by dividing into plural types of rendering objects, the specific image can be recognized even if such an illegal act is performed and the specific image can be prevented from being formed as it is.

In the example of the operation shown in FIG. 2, synthetic probability P is discriminated depending upon whether it is equal to or smaller than the predetermined threshold TH1 or exceeds TH1. However, determination in three or more stages and the control of the corresponding processing may also be performed without being limited to this. In case the output image data generation unit 14 outputs output image data at real time in addition to generating output image data, the output of output image data from the output image data generation unit 14 is temporarily stopped when synthetic probability P becomes high to some extent and when the synthetic probability P becomes higher, it is judged that the specific image exists and the processing may also be executed.

Figure 3:
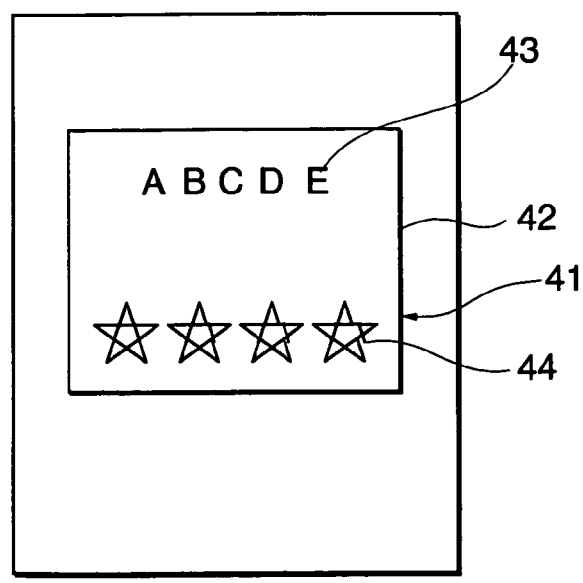
FIG. 3 is an explanatory view showing a concrete example of an image to be formed according to a rendering command.
Figure 4:
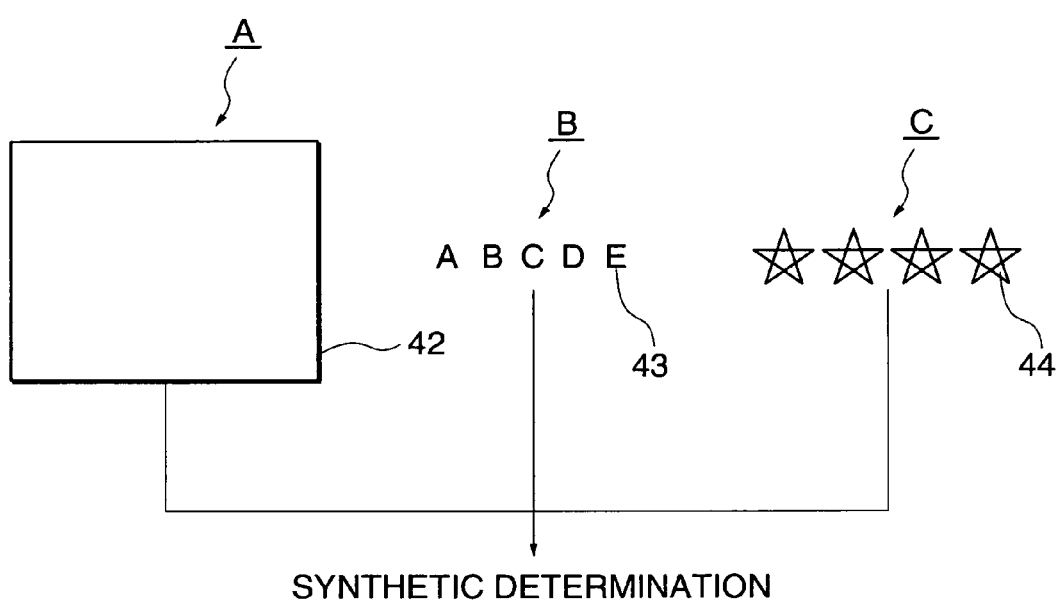
FIG. 4 is an explanatory view showing an example of each rendering object.

The operation described above will be described based upon a concrete rendering command below. FIG. 3 is an explanatory view showing a concrete example of an image to be formed according to a rendering command, FIG. 4 is an explanatory view showing an example of each rendering object and FIGS. 5A to 5D are explanatory views showing a concrete example of an image formed in case the specific image is included. As shown in FIG. 3, a reference number 41 denotes the specific image, 42 denotes a raster image, 43 denotes a character and 44 denotes a graphic form. In this case, a rendering command for forming the image shown in FIG. 3 as an example will be described below. For rendering objects to be the image shown in FIG. 3, a rendering object to be the raster image 42 which is a background image, a rendering object to be the character 43 and a rendering object to be the graphic form 44 such as a line are included in a rendering command. When an image is formed by these rendering objects as it is, the specific image 41 is formed.

The rendering command analysis unit 13 receives such a rendering command and passes each rendering object to the recognition unit corresponding to the type in order. The raster image 42 shown in FIG. 4A is passed to the recognition unit for a raster image 17 and the specific image or a part is recognized. As the background of the specific image exists though no character and no graphic form exist in this example, it is recognized that the specific image is probably included. Also, the character 43 is passed to the recognition unit for a character 19 and it is recognized whether the character is a character making up a part of the specific image or not. As the character is a rendering object made up of a character string "ABCDE" included in the specific image in this example, the character string making up a part of the specific image is recognized. Further, the graphic form 44 is passed to the recognition unit for graphics 18 and it is recognized whether a part of the specific image is formed or not. As the graphic form is a rendering object to be a graphic form included in the specific image in this example, the graphic form can be recognized as a part of the specific image.

The result of recognition is output from the recognition unit for a raster image 17, the recognition unit for graphics 18 and the recognition unit for a character 19 to the recognition determination unit 20. The recognition determination unit 20 synthetically determines the result of recognition output respectively from the recognition unit for a raster image 17, the recognition unit for graphics 18 and the recognition unit for a character 19 and determines whether the specific image 41 exists or not. As the result of recognition that the possibility of including the specific image is high is respectively acquired from the recognition unit for a raster image 17, the recognition unit for graphics 18 and the recognition unit for a character 19 in this example, synthetic probability P is very high. Therefore, the recognition determination unit determines that the specific image exists in an image rendering according to a rendering command and instructs the output image data generation unit 14 to execute processing when the specific image exists.

Figure 5A:
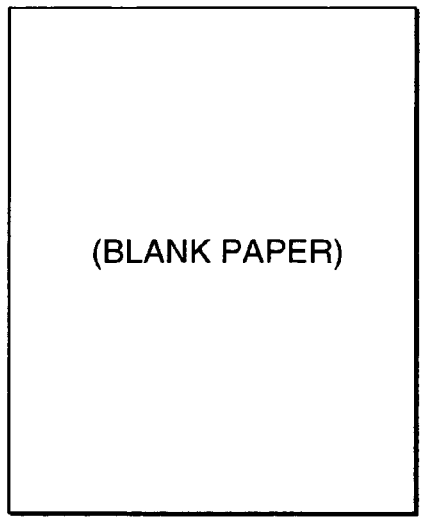
FIGS. 5A to 5D are explanatory views showing a concrete example of an image to be formed in case a specific image is included.
Figure 5B:
Figure 5C:
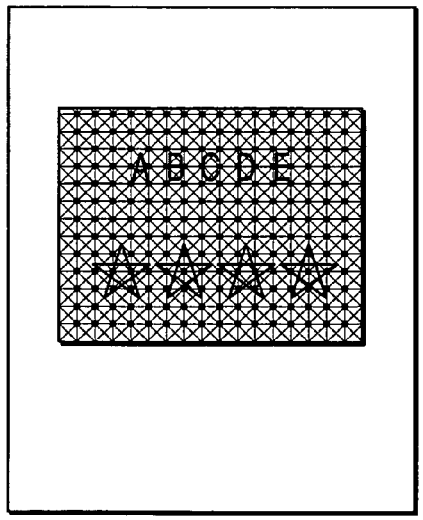
Figure 5D:
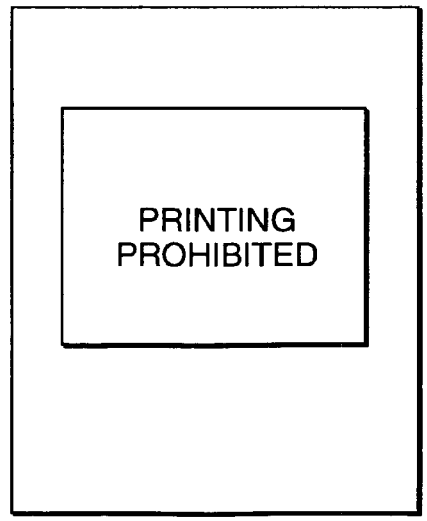

For processing when the specific image exists, as shown in FIG. 5A, the whole page is blanked or as shown in FIG. 5B, a message that printing is prohibited can be formed. Or, a predetermined pattern is overlapped on an area of the specific image or an area including the specific image as shown in FIG. 5C, and as shown in FIG. 5D, a message that printing is prohibited can also be added. Needless to say, specific working can be applied so that the image is not mistaken for the specific image without being limited to these output methods. Also, the generation of output image data or the operation itself of output may also be stopped.

FIG. 6 is a flowchart showing another example of the operation of the recognition determination unit 20 in an example of the image formation system including one embodiment of the invention. Depending upon the specifications of the image formation device 2, there is an image formation device according to a method of dividing an image for one page every unit called a band. When output image data is output to the image formation device 2 according to such a method, the output image data is generated and output in units of band.

In this case, a rendering command is interpreted in the rendering command analysis unit 13 and image data per band is generated. The image data divided per band is sent to the output image data generation unit 14 and a rendering object is passed to the recognition unit for a raster image 17, the recognition unit for graphics 18, the recognition unit for a character 19 and others according to the type of the rendering object in a band. Each recognition unit that receives a rendering object recognizes whether the specific image or a part is included or there is the possibility of making up a part of the specific image and outputs the probability to the recognition determination unit 20.

The recognition determination unit 20 determines the termination of the processing of all bands in a step S61 and acquires the probability of including the specific image as the result of recognition from recognition unit corresponding to the type of one or plural rendering objects existing in a band in a step S62 in case the band to be processed exists. That is, in this example, the recognition determination unit acquires the probability of including the specific image as the result of recognition from the recognition unit for a raster image 17, the recognition unit for graphics 18 and the recognition unit for a character 19. The recognition determination unit calculates new synthetic probability P based upon the result of recognition acquired from each recognition unit, synthetic probability P calculated based upon the result of recognition up to that point and others. In this case also, a method of calculating synthetic probability P is arbitrary. New synthetic probability P may also be calculated per a few bands in addition to being calculated per band.

In a step S63, new synthetic probability P calculated in S62 is determined. In this example, when synthetic probability P becomes high, the output per band of output image data from the output image data generation unit 14 is temporarily stopped and when synthetic probability P becomes higher, processing when the specific image exists is executed. That is, new synthetic probability P, the threshold TH1 and the threshold TH2 (TH1>TH2) are compared in S63 and in case the new synthetic probability P is smaller than the threshold TH2, it is judged that no specific image is included and the processing is continued as it is.

In case new synthetic probability P is equal to or larger than the threshold TH2 and is smaller than the threshold TH1, it is judged that there is the possibility of including the specific image and in S64, the output per band of output image data from the output image data generation unit 14 is temporarily stopped. Afterward, the generation of output image data in the output image data generation unit 14 can also be continued. Afterward, when synthetic probability P calculated again every one or a few bands becomes low, the output image data generation unit 14 can start the output operation of output image data again.

In case synthetic probability P further becomes high and exceeds the threshold TH1, it is judged that the possibility of including the specific image is high, the output image data generation unit 14 is instructed to temporarily stop the output of output image data and each recognition unit is instructed to execute the recognition processing of image data of the residual bands in a step S65. In case the result is determined in a step S66 and no specific image is included, the output image data generation unit 14 is instructed to restart the output of output image data in a step S67. In case the specific image is recognized, processing when the specific image exists is executed in a step S68. For the processing when the specific image exists, the step S54 shown in FIG. 2 and similar operation to that shown in FIGS. 5A to 5D and others can be executed.

As described above, in case output image data is output to an image formation device that forms an image per predetermined unit such as in units of band, recognition processing can also be executed while generating and outputting output image data. Therefore, when a normal image is formed, the speed of processing is hardly deteriorated by recognition processing and an image can be formed at high speed. As the output of output image data is stopped when it is determined that there is possibility that the specific image exists, a situation where most of the specific image is output by output per band can be avoided.

In FIG. 6, the case where synthetic probability P is calculated at three stages and control is performed at each stage is shown. However, the invention is not limited to this, and determination and the control of the corresponding processing at two stages or four or more stages for example may also be performed. Also, in the example shown in FIG. 6, a rendering command is divided in units of band, however, the invention is not limited to this and a rendering command may be divided into an arbitrary unit.

Further, in case a rendering command is input per predetermined unit in which an image is divided, recognition processing is executed per predetermined unit as described above and after the results of recognition are stored to some extent such as for one page, the existence of the specific image may also be synthetically determined.

Figure 7:
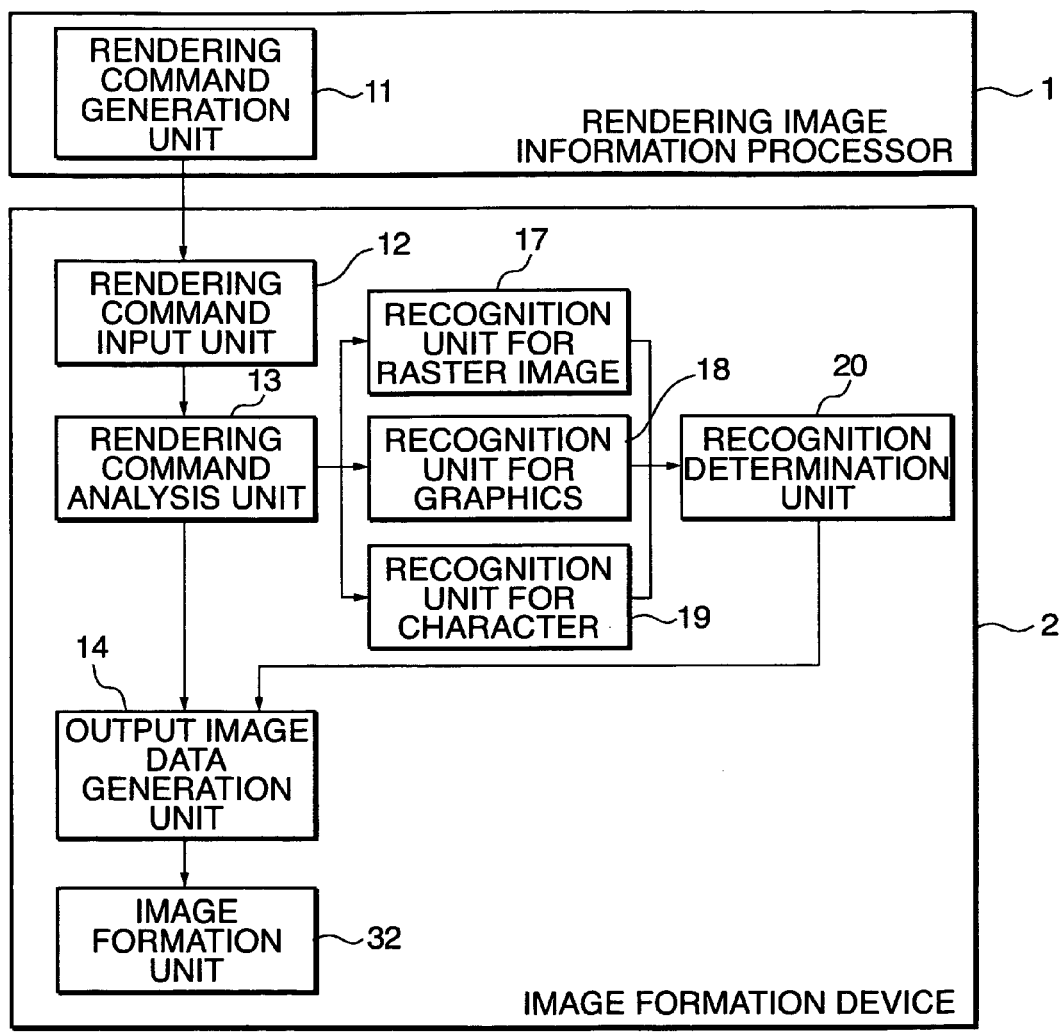
FIG. 7 is a block diagram showing another example of the image formation system including one embodiment of the invention.

FIG. 7 is a block diagram showing another example of the image formation system including one embodiment of the invention. A reference number in FIG. 7 is similar to that in FIG. 1. In FIG. 7, an example of the configuration in case the recognition of the specific image is tried in an image formation device is shown. In this example, a rendering command generation unit 11 in a rendering image information processor 1 outputs a rendering command described in PDL and others to an image formation device 2. The rendering command generation unit 11 in this example executes processing in rendering except the recognition processing of the specific image in the application program 3 and the printer driver 4 in FIG. 1.

A rendering command sent from the rendering image information processor 1 is received by a rendering command input unit 12 and is passed to a rendering command analysis unit 13. The rendering command analysis unit 13 analyzes the rendering command as described above and passes the result of the analysis of the rendering command to an output image data generation unit 14. Also, the rendering command analysis unit 13 passes a rendering object to a recognition unit (a recognition unit for a raster image 17, a recognition unit for graphics 18 and a recognition unit for a character 19) corresponding to the type per rendering object in the rendering command.

The output image data generation unit 14 generates output image data based upon an image can be formed by an image formation unit 32 such as a raster image according to the result of the analysis of the rendering command in the rendering command analysis unit 13. The generated output image data is output to the image formation unit 32 and an image is formed on a record medium such as paper.

As the operation in each recognition unit and the operation in a recognition determination unit 20 are similar to those in the configuration shown in FIG. 1, the description is omitted.

Figure 8:
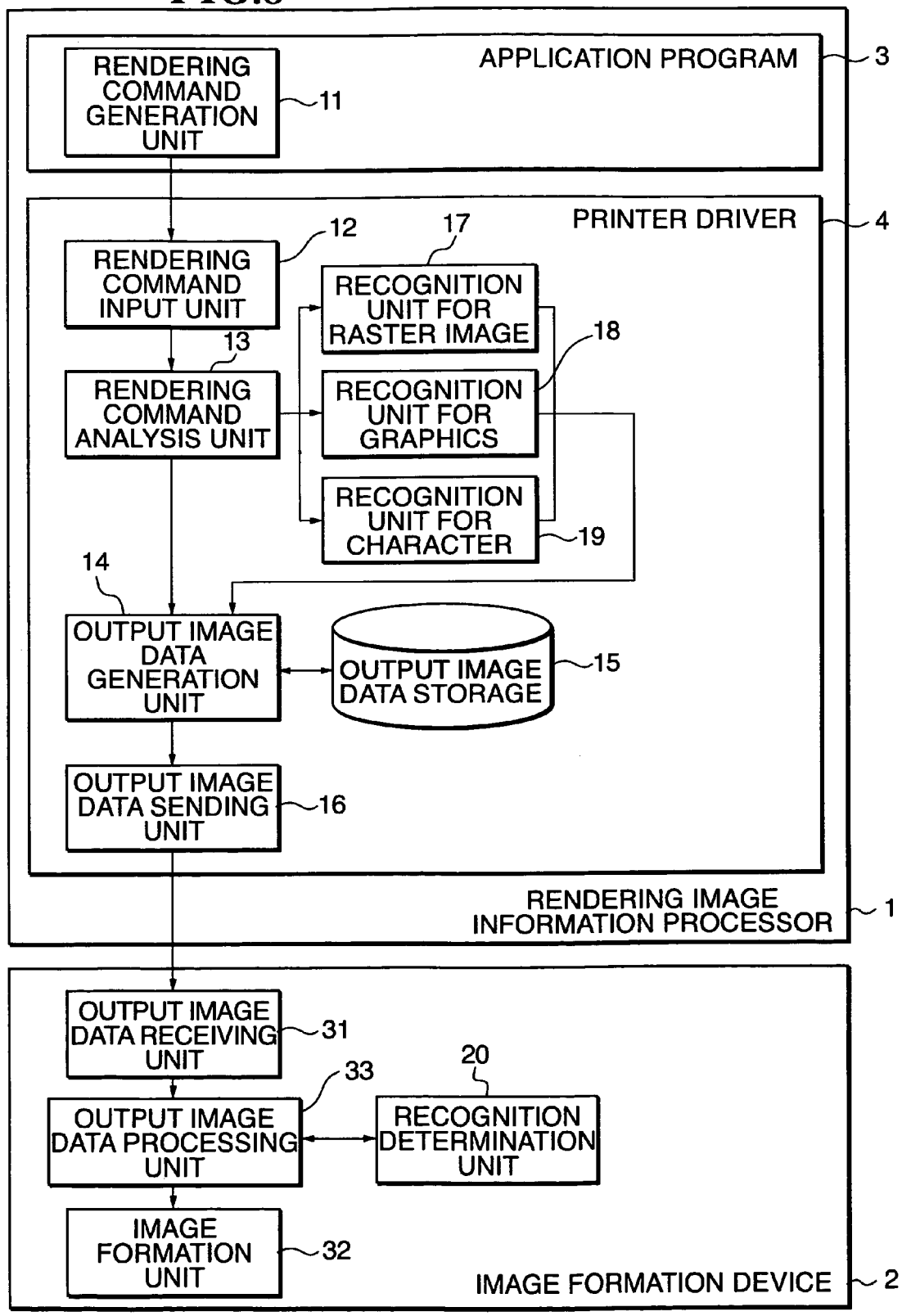
FIG. 8 is a block diagram showing further another example of the image formation system including one embodiment of the invention.

FIG. 8 is a block diagram showing further another example of the image formation system including one embodiment of the invention. As shown in FIG. 8, the same reference number is allocated to a part similar to that in FIG. 1 and the description is omitted. A reference number 33 denotes an output image data processing unit. In an example shown in FIG. 8, the result of the recognition of the specific image per rendering object is added to the rendering object in output image data and is transferred to an image formation device 2, and referring to the added result of recognition when the output image data is processed in the image formation device 2, it is synthetically determined whether the specific image exists or not.

In a printer driver 4, a rendering object is passed from a rendering command analysis unit 13 to each recognition unit, in this example a recognition unit for a raster image 17, a recognition unit for graphics 18 and a recognition unit for a character 19 corresponding to the type. The result of recognition in each recognition unit is passed to an output image data generation unit 14 and is added to the corresponding rendering object in output image data. The output image data in which the result of the recognition is added to the rendering object is sent from an output image data sending unit 16 to the image formation device 2.

In the image formation device 2, an output image data receiving unit 31 receives the output image data and an output image data processing unit 33 executes processing such as analyzing the output image data and converting it to data based upon an image can be formed by an image formation unit 32. At this time, the result of recognition added to the rendering object in the output image data is passed to a recognition determination unit 20. The recognition determination unit 20 synthesizes the results of recognition added to each rendering object and determines whether the specific image is included or not. In case it is determined that the specific image is included, the output image data processing unit 33 is instructed to execute processing when the specific image exists. At this time, the processing in S54 in FIG. 2 or shown in FIGS. 5A to 5D is executed.

In the configuration shown in FIG. 8, each recognition unit and the recognition determination unit 20 are respectively provided in a rendering image information processor 1 and the image formation device 2. The invention is not limited to this configuration, the image processor according to the invention can be implemented in various configuration such as a print server is provided midway and functions are dispersed among the rendering image information processor 1, the print server, the image formation device 2 and others. In case a function is dispersed as described above, it is desirable that image data is transferred in a state in which the result of recognition in each recognition unit and the result of determination by the recognition determination unit 20 are included in each rendering object in the image data transferred among respective devices.

Figure 9:
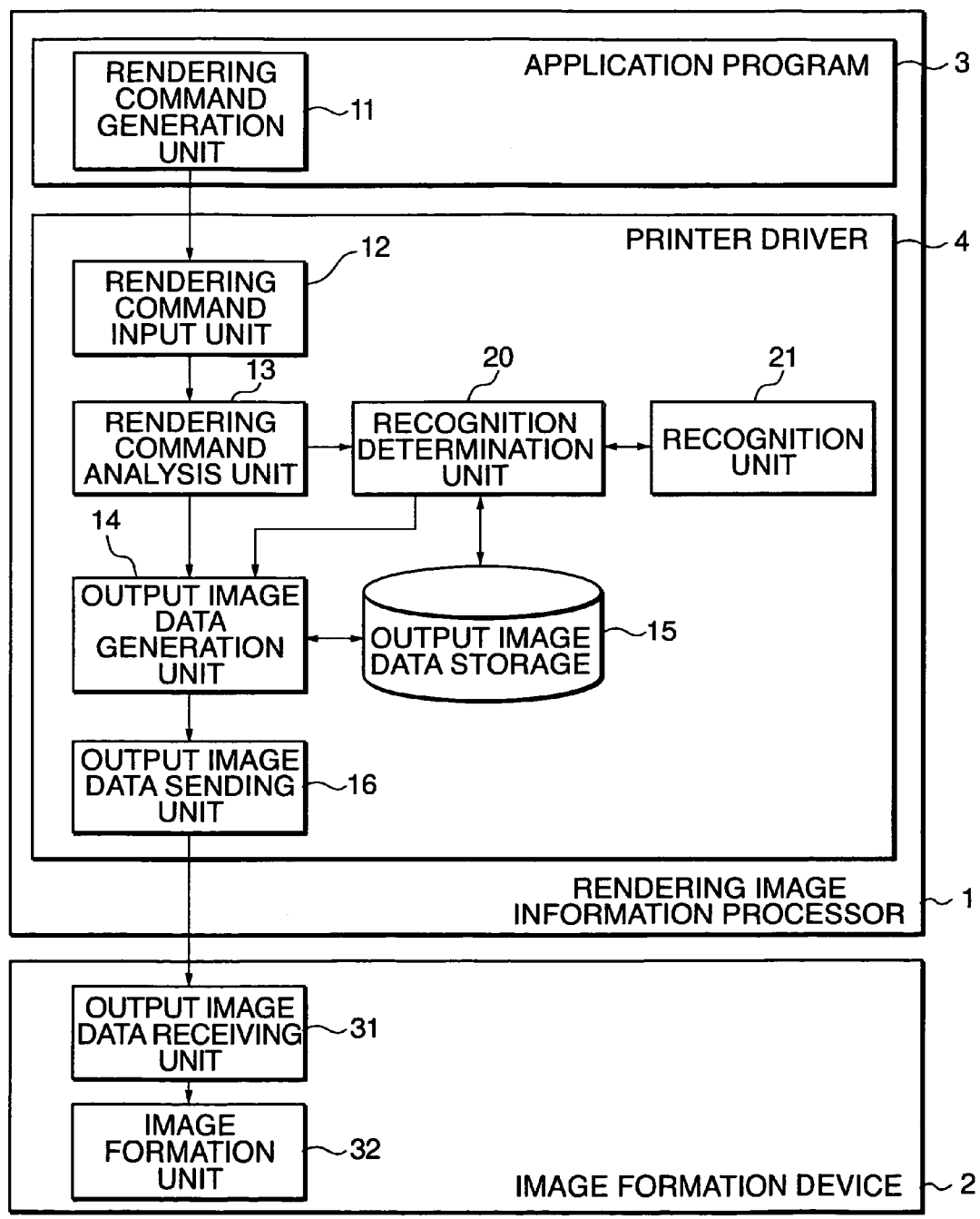
FIG. 9 is a block diagram showing an example of an image formation system including another embodiment of the invention.

FIG. 9 is a block diagram showing an example of an image formation system including another embodiment of the invention. In FIG. 9, the same reference number is allocated to a part similar to that in FIG. 1 and the description is omitted. A reference number 21 denotes a recognition unit. In this example, recognition processing is first applied to a specific type of rendering object and in case there is the possibility of including the specific image, recognition is also performed for another rendering object.

A rendering command analysis unit 13 analyzes a rendering command, passes the result of the analysis of the rendering command to an output image data generation unit 14 and passes a specific type of rendering object in the rendering command to a recognition determination unit 20.

The recognition determination unit 20 passes the specific type of rendering object passed from the rendering command analysis unit 13 to the recognition unit 21 and instructs the recognition unit to try the recognition of the specific image. In case the result of recognition for the specific type of rendering object from the recognition unit 21 shows the possibility of including the specific image, the recognition determination unit passes the specific type of rendering object to the recognition unit 21 together with other types of rendering objects and instructs the recognition unit to try the recognition of the specific image. The recognition determination unit receives the result of recognition processing including other types of rendering objects and finally judges whether the specific image is included or not. In case the recognition determination unit finally judges that the specific image is included, it instructs the output image data generation unit 14 to execute processing when the specific image exists.

When the specific type of rendering object is passed to the recognition unit 21 together with other types of rendering objects, the rendering objects may also be passed from the rendering command analysis unit 13. Also, it is also conceivable that a rendering command already processed is referred by the rendering command analysis unit 13, in that case, output image data in an output image data storage 15 is acquired and may also be passed to the recognition unit 21.

The recognition unit 21 is provided with recognition units such as the recognition unit for a raster image 17, the recognition unit for graphics 18 and the recognition unit for a character 19 respectively shown in FIG. 1 per type of a rendering object. The recognition unit corresponding to the type of the rendering object passed from the recognition determination unit 20 tries recognition and returns the result to the recognition determination unit 20. Required recognition units have only to be provided such as only a recognition unit for a raster image 17 is provided in case another rendering object is also converted to a raster image in recognition including another rendering object performed when the type of a rendering object to first try recognition is a raster image and there is the possibility of including the specific image.

Figure 10:
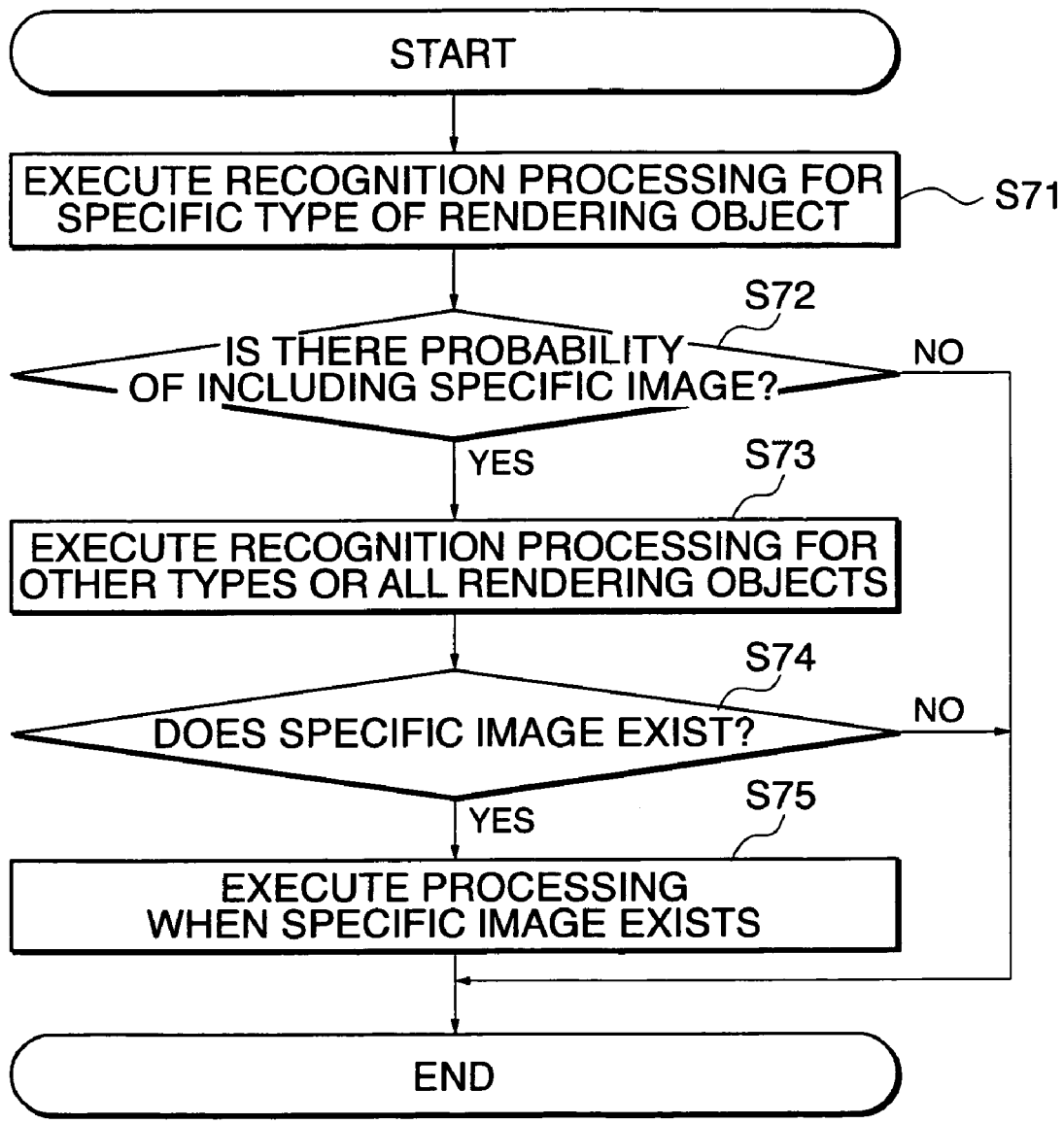
FIG. 10 is a flowchart showing an example of the operation of a recognition determination unit 20 in the example of the image formation system including another embodiment of the invention.

FIG. 10 is a flowchart showing an example of the operation of the recognition determination unit 20 in the example of the image formation system including another embodiment of the invention. In a step S71, when the recognition determination unit receives a specific type of rendering object, it first passes the rendering object to the recognition unit 21 and instructs the recognition unit to execute recognition processing. The recognition determination unit receives the result of recognition from the recognition unit 21 and determines whether or not the result of the recognition shows that there is the possibility of including the specific image in a step S72. In case the recognition determination unit determines that the possibility of including the specific image is low, it terminates the recognition processing of the rendering object.

In case the result of recognition for the specific type of rendering object shows that there is the possibility of including the specific image, the recognition determination unit passes it to the recognition unit 21 together with other types of rendering objects in a step S73 and instructs the recognition unit to execute recognition processing. A rendering object passed to the recognition unit 21 at this time may also be limited to an object rendering in the periphery of a rendering object formerly recognized which includes the specific image or may also be a rendering object for one page. Also, in case a rendering object is already converted to a raster image by an output image data generation unit 14, the converted raster image may also be passed to the recognition unit 21. When the current processing proceeds to the processing in S73, the output of output image data from the output image data generation unit 14 may also be temporarily stopped.

The result of recognition processing including other types of rendering objects is determined in a step S74 and in case it is determined that no specific image is included, the processing is returned to normal processing. In case the output of output image data by the output image data generation unit 14 is temporarily stopped in S73, output is restarted. Also, the recognition processing of a new rendering object passed from the rendering command analysis unit 13 is restarted.

In case the result of recognition processing including other types of rendering objects shows that the specific image is included, processing when the specific image exists is executed in a step S75. For the processing when the specific image exists, similar processing to that in S54 in FIG. 2 can be executed.

As described above, in case the specific image is made up, it may be very difficult to make up the specific image if a specific type of rendering object such as a raster image is not used. In such a case, recognition processing is first applied to the specific type of rendering object such as a raster image utilizing this embodiment and in case no specific image is included, the recognition processing is terminated as it is. Hereby, recognition processing can be sped up. As the recognition of the specific image is also tried for other types of rendering objects when the result of recognition for a specific type of rendering object such as a raster image shows that there is the possibility of including the specific image, the recognition precision of the specific image can be kept. Also, as plural rendering objects are synthetically recognized even if the specific image is made up of the plural types of rendering objects, the specific image can be recognized.

Processing per predetermined unit such as a band can also be applied to the configuration in this embodiment shown in FIGS. 9 and 10 as described in relation to FIG. 6. Also, as shown in FIG. 7, processing for recognizing the specific image may also be executed by the image formation device 2.

Figure 11:
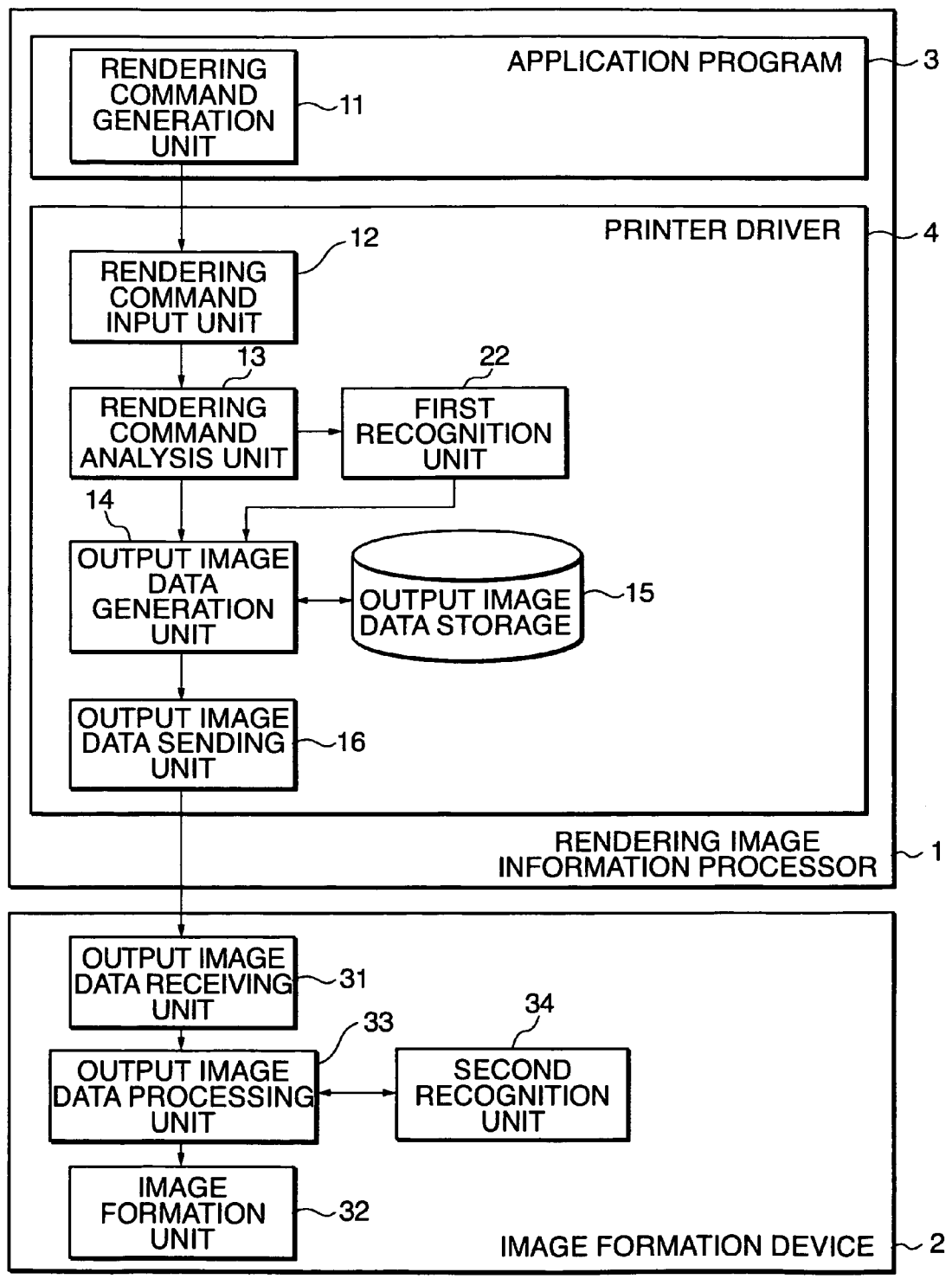
FIG. 11 is a block diagram showing another example of the image formation system including another embodiment of the invention.

FIG. 11 is a block diagram showing another example of the image formation system including another embodiment of the invention. In FIG. 11, the same reference number is allocated to a part similar to that in FIGS. 8 and 9 and the description is omitted. A reference number 22 denotes a first recognition unit and 34 denotes a second recognition unit. The example shown in FIG. 11 corresponds to the example shown in FIG. 8 and the recognition processing of the specific image is dispersed in a rendering image information processor 1 and an image formation device 2.

In a printer driver 4, when a specific type of rendering object is detected by a rendering command analysis unit 13, the rendering command analysis unit passes it to the first recognition unit 22 and instructs the first recognition unit to try the recognition of the specific image in the rendering object. Therefore, the first recognition unit 22 has only to apply recognition processing to the specific type of rendering object. The result of recognition by the first recognition unit 22 is added to the rendering object in output image data and is transferred to the image formation device 2.

In the image formation device 2, an output image data receiving unit 31 receives the output image data, an output image data processing unit 33 analyzes the output image data and an image formation unit 32 executes processing such as converting it to data based upon which an image can be formed. At this time, referring to the result of recognition added to the specific type of rendering object in the output image data, it is judged whether the specific image exists or not. In case the result of recognition that there is no possibility of including the specific image or the possibility is very low is added, the image formation unit 32 forms an image without executing recognition processing in the second recognition unit 34. Hereby, time required for recognition processing can be reduced.

Also, in case the result of recognition that there is the possibility of including the specific image is added, other types of rendering objects or all rendering objects are input to the second recognition unit 34 to execute processing for recognizing the specific image there. In case the specific image is recognized by the second recognition unit 34, the output image data processing unit 33 executes processing when the specific image exists. For the processing at this time, the processing in S54 in FIG. 2 or shown in FIGS. 5A to 5D can be executed.

As shown in the configuration shown in FIG. 11, recognition processing at two stages is respectively executed in the rendering image information processor 1 and the image formation device 2. The invention is not limited to this, the image processor according to the invention can be implanted in various configuration. For example, a printer server can be provided midway and a function can be dispersed among the rendering image information processor 1, the print server, the image formation device 2 and others. In case a function is dispersed as described above, it is desirable that image data transferred between each device is transferred in a state in which the result of recognition in each recognition unit is added to the image data. Also, in case image data is transferred among some devices as described above, the processing may also be dispersed into recognition processing at three or more stages.

Figure 12:
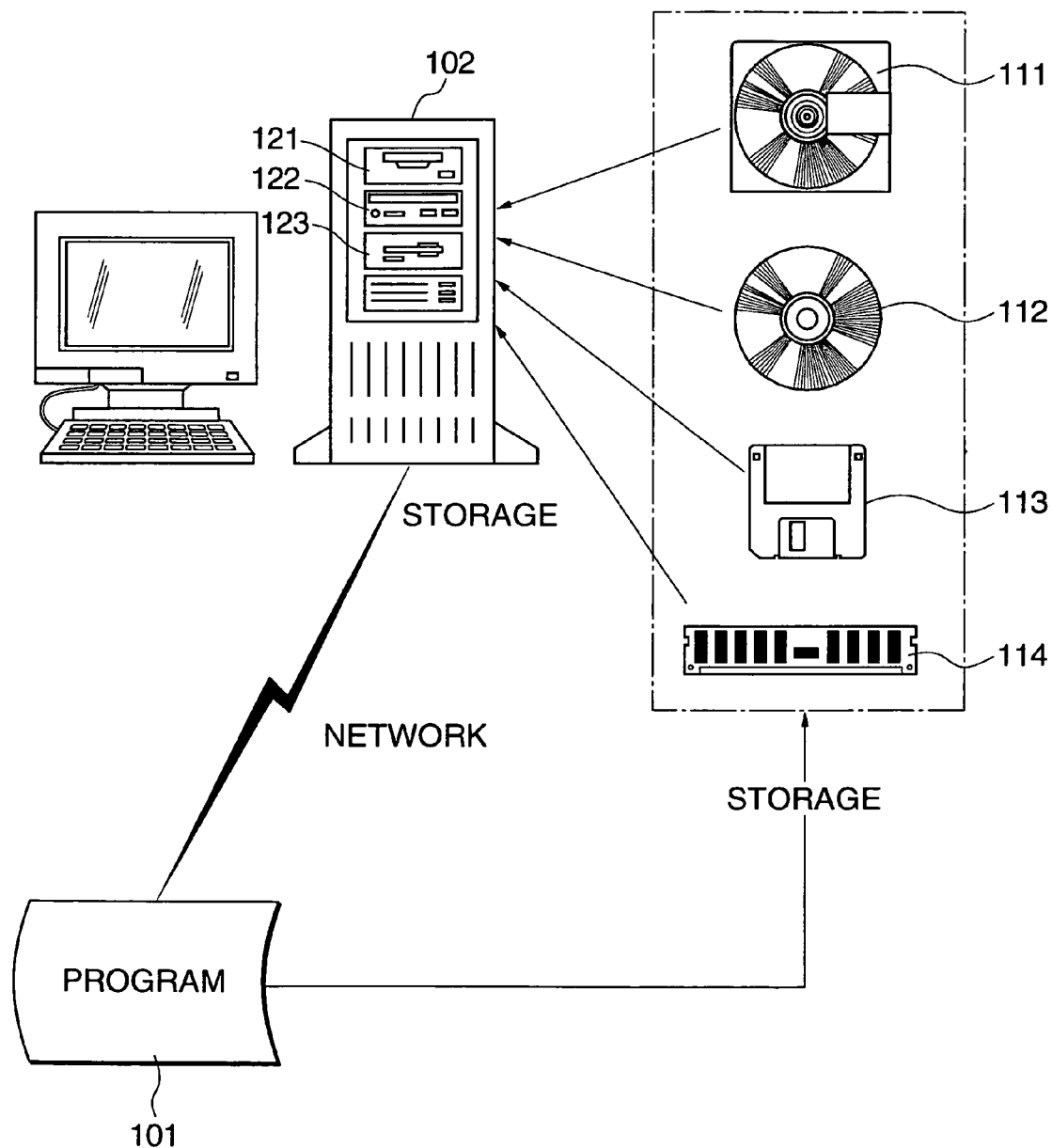
FIG. 12 is an explanatory view showing an example of a storage medium storing a computer program in case an image processing method according to the invention is implemented in the computer program.
Figure 13:
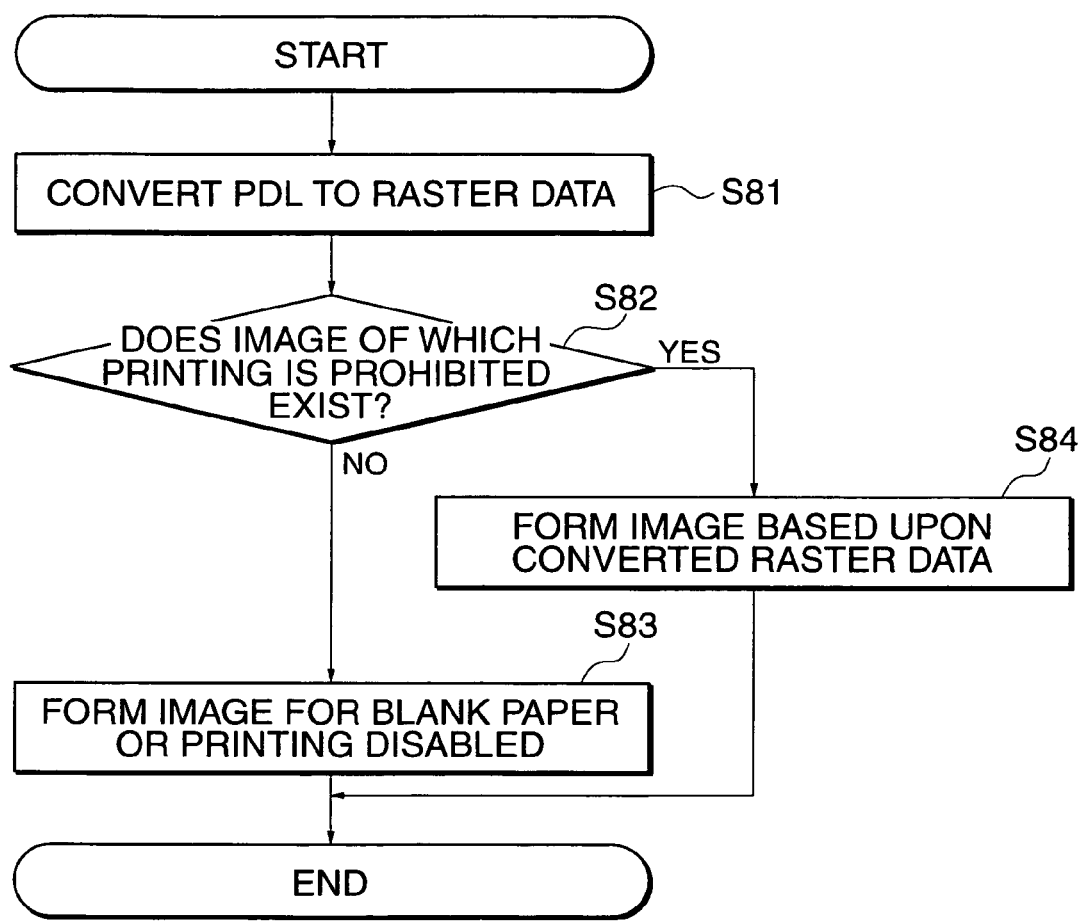
FIG. 13 is a flowchart showing an example of printing operation in case processing for recognizing an image of which the printing is prohibited is executed in a printer.

FIG. 12 is an explanatory view showing an example of a storage medium storing a computer program in case the image processing method according to the invention is implemented in the computer program. As shown in FIG. 12, a reference number 101 denotes a program, 102 denotes a computer, 111 denotes a magneto-optic disk, 112 denotes an optical disk, 113 denotes a magnetic disk, 114 denotes a memory, 121 denotes a magneto-optic disk unit, 122 denotes an optical disk unit and 123 denotes a magnetic disk unit.

Each embodiment described above of the invention can also be implemented by the program 101 which can be run by the computer. In that case, the program 101, data used by the program and others can also be stored in a computer-readable storage medium. A storage medium causes a state in which energy such as magnetism, light and electricity varies according to the contents of a program in a reader provided to hardware resources of a computer and can transmit the contents of the program to the reader in the form of a signal corresponding to the change. For example, the magneto-optic disk 111, the optical disk 112, the magnetic disk 113 and the memory 114 are the storage medium. Needless to say, these storage media are not limited to a portable type.

The program 101 is stored on these storage media, the program 101 is read from the computer and the image processing method according to the invention can be executed respectively by installing these storage media in the magneto-optic disk unit 121, the optical disk unit 122, the magnetic disk unit 123 or a memory slot not shown respectively of the computer 102. Or, the storage medium is installed in the computer 102 beforehand, the program 101 is transferred to the computer 102 via a network and others, is stored on the storage medium and may also be executed.

As clear from the above-mentioned description, according to the invention, as processing for recognizing the specific image is executed per type of a rendering object, recognition processing can be executed in parallel with the generation of output image data and others and the specific image can be recognized at high speed. Also, when the results of the recognition of rendering objects are synthesized and the specific image is recognized, the specific image can also be precisely recognized in a wicked case where the specific image is made up by combining different types of rendering objects.

Also, as the processing for recognizing the specific image is applied to the specific type of rendering object, the other types of rendering objects are synthesized and recognition processing is applied in case there is the possibility of including the specific image, time required for recognition processing can be reduced, compared with a case where recognition processing is always applied to all types of rendering objects.

Further, as the recognition of the specific image is also tried every partial image, the results of recognition per partial image are synthesized and it is determined whether the specific image exists or not in case image data divided per partial image is sent, the specific image can be precisely recognized even if the specific image is divided and output. Also, there is effect that high-speed recognition processing is enabled, compared with a case where recognition processing is applied after all partial images are gathered and the invention can also be applied to a case where image formation is performed in units of band in an image formation device.

The entire disclosure of Japanese Patent Application No. 2000-128345 filed on Apr. 27, 2000 including specification, claims, drawings and abstract is incorporated herein by reference in its entirety.

What is claimed is:

1. An image processor provided with a function for recognizing a specific image data, comprising:
   a plurality of recognition parts, wherein each of the plurality of recognition parts is dedicated to process a specific type of rendering object that makes up the image data, and
   at least one recognition part recognizes whether a specific image is included or not in the image data; and
   a determination part that determines based on the result of recognition by one or plural recognition parts whether the specific image is included or not in the image data.

2. An image processor provided with a function for recognizing a specific image in image data, comprising:
   a plurality of recognition parts, wherein each of the plurality of recognition parts is dedicated to process a specific type of rendering object that makes up the image data, and
   at least one recognition part recognizes the specific image; and
   a determination part that instructs the recognition part to make recognition on the specific type of rendering object in the image data, and when the result of the recognition shows the possibility of including the specific image in the image data, synthesizes another type of rendering object and instructs the recognition part to make recognition thereon.

3. An image processor provided with a function for recognizing a specific image in image data, a plurality of recognition parts, wherein each of the plurality of recognition parts is dedicated to process a specific type of rendering object that makes up the image data, and the image data divided into partial images, comprising:
   at least one recognition part that recognizes the specific image; and
   a determination part that instructs the recognition part to make recognition on every one or plural partial images, synthesizes the result of recognition on partial images and determines whether the specific image exists or not.

4. An image processor according to claim 3, wherein:
the determination part synthesizes and determines the result of recognition by each recognition part provided corresponding to the type of the rendering object in a partial image.

5. An image processor according to claim 1, further comprising:
an output image data generation part that generates output image data in the image data and outputs it, wherein:
the determination part instructs the output image data generation part to stop the output of the output image data when the determination part determines the possibility of including the specific image in the image data is high.

6. An image processing method of recognizing a specific image in image data, each of a plurality of recognition parts is dedicated to process a specific type of rendering object, comprising:
making recognition on the specific type of rendering object whether a specific image is included or not; and
determining based upon the result of the recognition on respective rendering objects whether the specific image is included in the image data or not.

7. An image processing method of recognizing a specific image in image data, each of a plurality of recognition parts is dedicated to process a specific type of rendering object, comprising:
making recognition of the specific image based on the specific type of rendering object in the image data; and
when the result of recognition shows the possibility of including the specific image in the image data, synthesizing another type of rendering object and making recognition of the specific image.

8. An image processing method of recognizing a specific image in image data, each of a plurality of recognition parts is dedicated to process a specific type of rendering object, and the image data divided into partial images, comprising:
making recognition of the specific image on every one or plural partial images; and
synthesizing the result of recognition on the partial images and determining whether the specific image exists or not in the image data.

9. An image processing method according to claim 8, wherein:
when the recognition of the specific image is made on every one or plural partial images, the recognition of the specific image is made per type of the rendering object; and
the result of recognition per type of the rendering object is synthesized and the recognition of the specific image is made.

10. An image processing method according to claim 6, further comprising:
generating output image data based upon the image data in parallel with recognizing the specific image and outputting the output image data; and
stopping the generation of the output image data when it is determined that the possibility of including the specific image in the image data is high.

11. A computer-readable storage medium storing a program for recognizing a specific image in image data, each of a plurality of recognition parts is dedicated to process a specific type of rendering object, and the program instructing a computer to execute the following steps of:

making recognition on specific type of rendering object whether a specific image is included or not; and
determining based upon the result of the recognition on respective rendering objects whether the specific image is included in the image data or not.

12. An image processor provided with a function for recognizing a specific image data, comprising:
a plurality of recognition parts, wherein each of the plurality of recognition parts is dedicated to process a specific type of rendering object that makes up the image data, and recognizes whether a specific image is included in the image data; and
a determination part that determines, based on the result of recognition by the plurality of recognition parts whether the specific image is included in the image data.

13. An image processor provided with a function for recognizing a specific image data, comprising:
a plurality of recognition parts, wherein each of the plurality of recognition parts is dedicated to process a specific type of rendering object that makes up the image data, and recognizes whether a specific image is included in the image data; and
a determination part that instructs the plurality of recognition parts to make recognition on the specific type of rendering object in the image data, and when the result of the recognition shows a possibility of including the specific image in the image data, synthesizes another type of rendering object and instructs the plurality of recognition parts to make recognition thereon.

14. An image processor provided with a function for recognizing a specific image in image data divided into partial images; comprising:
a plurality of recognition parts, wherein each of the plurality of recognition parts is dedicated to process a specific type of rendering object that makes up the image data, and recognizes whether a specific image is included in the image data; and
a determination part that instructs the plurality of recognition parts to make recognition on every plural partial images, synthesizes the result of recognition on partial images and determines whether the specific image exists.

15. The image processor according to claim 14, wherein:
the determination part synthesizes and determines the result of recognition by each of the plurality of recognition parts in a partial image.

16. A method for recognizing a specific image data by an image processor, comprising:
recognizing, by a plurality of recognition parts, wherein each of the plurality of recognition parts is dedicated to process a specific type of rendering object that makes up the image data, whether a specific image is included in the image data; and
determining, by a determination part, whether the specific image is included in the image data based on a result of recognition by the plurality of recognition parts.

17. A method for recognizing a specific image data by an image processor, comprising:
recognizing, by a plurality of recognition parts, wherein each of the plurality of recognition parts is dedicated to process a specific type of rendering object that makes up the image data, whether a specific image is included in the image data; and instructing the plurality of recognition parts, by a determination part, to make recognition on the specific type of rendering object in the image data;

synthesizing another type of rendering object when the result of the recognition shows the possibility of including the specific image in the image data; and instructing the plurality of recognition parts to make recognition thereon.

18. A method for recognizing a specific image in image data divided into partial images by an image processor, comprising:

recognizing, by a plurality of recognition parts, wherein each of the plurality of recognition parts is dedicated to process a specific type of rendering object that makes up the image data, whether a specific image is included in the image data; and instructing the plurality of recognition parts, by a determination part, to make recognition on every plural partial images;

synthesizing the result of recognition on partial images; and determining whether the specific image exists or not.

19. The image processing method according to claim 18, wherein:

synthesizing and determining by the determination part, the result of recognition by each of the plurality of recognition parts in a partial image.

20. An image processor for processing image data including at least one of a rendering object of character, comprising:

a plurality of recognition parts, wherein each of the plurality of recognition parts is dedicated to process a specific type of rendering object that makes up the image data, and a recognition part that recognizes whether a specific image is included or not in the image data by analyzing the rendering object of character to recognize a character which composes a part of the specific image; and a determination part that determines based on the result of recognition by the recognition part whether the specific image is included or not in the image data.

* * * * *